Patented Mar. 22, 1927.

1,622,228

UNITED STATES PATENT OFFICE.

THOMAS MIDGLEY, JR., OF DAYTON, OHIO, ASSIGNOR, BY MESNE ASSIGNMENTS, TO GENERAL MOTORS CORPORATION, OF DETROIT, MICHIGAN, A CORPORATION OF DELAWARE.

PROCESS OF MAKING ORGANIC LEAD COMPOUNDS.

No Drawing.   Application filed May 19, 1923. Serial No. 640,275.

This invention relates to modes of producing hydrocarbon compounds (alkyl and aryl) of lead, and the invention is directed particularly to the synthesis of lead tetra alkyl compounds of which lead tetra ethyl is an example.

The principal objects of my invention are to increase the yields, reduce the cost of manufacture and avoid violent reaction.

My method comprises broadly the combining of lead with an alkyl, or an aryl radical by causing the lead to react with a halogen derivative of a hydrocarbon through a process of reduction while these materials are in contact with one another and, if desired, by promoting this reaction with a catalyst.

This reduction may be effected for example, by the use of a second metal such as sodium, zinc, silicon or ferrosilicon with water, the metal acting on the water with which the substances are mixed, to release active or nascent hydrogen which in turn acts on other material present so as to form an alkyl or aryl compound with the first metal. My invention is not limited to this method of reduction for other well known methods, such as electrolysis may be employed. It has been found that the best results are obtained in non-acid solutions or mixtures. The use of a catalyst promotes these reactions and effects large yields from compounds such as ethyl bromide and butyl chloride which under normal conditions are relatively inert when the catalyst is not used.

By way of example, I may form a sodium lead alloy, $Na_4Pb$, (containing about 31% sodium by weight) and place 5 parts of this alloy, either in the form of a solid cake or small pieces, in a reflux apparatus, together with 7 parts of ethyl bromide, 1 part of pyridine and 15 parts of water (all parts by weight), the water being added slowly to the mixture, the period of addition being preferably about 16 hours. The quantity of water used in the specific example is about twelve times the theoretical quantity on a sodium basis. The mixture is stirred to avoid stratification, to effect an intimate relation between the several materials and to prevent lead precipitate from coating the alloy. Apparently, the sodium reacts with the water forming NaOH and releasing active hydrogen which reduces the ethyl bromide ($C_2H_5Br$) to ethyl ($C_2H_5$), group and HBr, and the lead combines with the ethyl group forming first the unstable compound $Pb(C_2H_5)_2$ which breaks up into the more stable $Pb(C_2H_5)_4$ and Pb. This decomposition takes place rapidly at a temperature in the neighborhood of the boiling point of ethyl bromide. The free lead tends to settle to the bottom of the reflux apparatus and coat the alloy. A slight alkalinity promotes the reaction and avoids acidity which is detrimental to the reaction.

The breaking up the $Pb(C_2H_5)_2$ to Pb and $PbEt_4$ is exothermic and may take place violently. The reaction is carried on at a sufficiently high temperature (preferably about 35° C. or slightly below the boiling point of the ethyl bromide) that high concentration of the intermediate compound $Pb(C_2H_5)_2$ does not occur, because at the higher temperature it decomposes as rapidly as it is formed. Good results have been obtained at temperatures between 20° C. and 38° C. but a lowering of the temperature of the mixture decreases the rate of the reaction. The temperature of the mixture may be controlled, in part, by regulating the rate of adding of the water to avoid a too rapid reaction of sodium and water. The rate at which the water is added may be increased, as the reaction proceeds, to prevent a diminution of the reaction rate by a dilution with NaOH and other byproducts. The reaction is preferably started at about the boiling point of the ethyl bromide, but, since the heat evolved may raise the temperature and vaporize the ethyl bromide, a reflux apparatus is used to condense and return this substance to the vessel.

The lead tetraethyl in the apparatus is then steam distilled out, preferably by introducing the steam into the liquid, the lead tetraethyl being collected in a separate vessel.

The slow addition of water is employed to retard the evolution of hydrogen and cause the several reactions to proceed at about the same rate, to avoid the formation of molecular hydrogen with its resultant waste of sodium, and to assist in controlling the temperature of the mass.

This method may be varied as follows;

Compounds containing a methyl, ethyl, propyl, isopropyl, butyl, amyl, phenyl or other alkyl or aryl radical combined with iodine, bromine, or chlorine (known herein as halogens) may be used in place of the ethyl bromide and the process may be carried out in the same mode and with stoichiometrically equivalent parts of each substance as when using ethyl bromide. Owing to the volatility of some of the alkyl halides, the temperature and pressure under which the reactions are carried out are so chosen that the alkyl halide remains in the reaction vessel, thereby preventing losses and increasing the yield. For example, using ($C_2H_5,Br,$) the reaction may be carried on either under atmospheric pressure at 35° C. or under a pressure of about 3 atmospheres at 60° C. Ethyl chloride may be used either under atmospheric pressure at a temperature below its boiling point, for example, 0° C. or at a temperature above its boiling point and under pressure, such as 5 atmospheres absolute pressure at 60° C. The chlorides are generally less active than the iodides or bromides and it has been found preferable to use ethyl acetate in place of water as the hydrogenizing agent. Ether is the preferred catalyst in this reaction. When water is used aniline is the preferred catalyst. When the $Pb(C_2H_5)_2$ does not decompose rapidly at the lower temperatures, the temperature of the reaction mass may be increased to thermally decompose the $Pb(C_2H_5)_2$. If the alkyl halide used has a higher boiling point than ethyl bromide, the temperature of the reaction is preferably increased accordingly.

The quantity of sodium used may be reduced by using an alloy having a smaller proportional sodium content. The lead and sodium in the alloy are referred to herein as metallic elements, metallic lead, and metallic sodium as contrasted, for example, with salts, esters, etc., for the metals in the alloy react in the same manner as the separate metallic elements would.

The reaction may be carried on without the use of a catalyst especially when an iodide is employed, it being preferred however, to use a catalyst and a bromide as the latter is less expensive than the corresponding iodide, and larger yields are obtained with the aid of a catalyst.

Where metals or their equivalents for liberating hydrogen, such as zinc, silicon and ferro-silicon are substituted for the sodium, these metals need not be alloyed with the lead and all the metal may be ground to a fine powder and the mixture stirred to effect an intimate contact between the ingredients. The stoichiometrically equivalent parts of any of these metals may be used in place of the sodium. These metals react more readily in the presence of a basic solution such, for example, as an NaOH solution.

The catalysts employed are of the type used with the Grignard synthesis, heterocyclic nitrogen compounds, trivalent nitrogen compounds having an alkaline reaction, and catalysts of the type designated broadly by the formula $RNW_2$, in which R stands for a hydrocarbon radical of which $C_6H_5$ and $C_4H_9$ are examples of simple hydrocarbon radicals, and $C_6H_3(CH_3)_2$ and $C_6H_4(C_2H_5)$ are examples of more complex hydrocarbon radicals, N stands for trivalent nitrogen, and W stands for hydrogen or an alkyl, aryl or phenyl group. The words "type used with the Grignard synthesis" are used herein to include broadly the catalyst used with the Grignard synthesis, for in this synthesis anhydrous ether is employed while in my process it is not necessary to so limit the form of the ether, and ether may be employed when water is used to produce nascent hydrogen for reducing purposes. The catalysts as defined above also include the alkyl-halide addition products thereof.

In these classes of catalysts are found primary, secondary, and tertiary amines, either aliphatic, aromatic, heterocyclic, or combinations thereof, secondary or tertiary base compounds, and the alkyl-halide addition products of these compounds.

Among these compounds successfully employed as catalysts are aniline, methyl aniline, diethyl aniline, toluidine, diphenylamine, phenylene diamine, triethylamine, butylamine, amylamine, pyridine, carbazole, piperidine, phenyl hydrazine, triethyl phenyl ammonium iodide, acetamide, ether, ammonia, and quinoline.

I claim:

1. The process of producing a hydrocarbon compound of lead which comprises mixing the lead with a hydrocarbon compound of a halogen; and reducing with nascent hydrogen the reaction mass thus formed in the presence of a catalyst.

2. A process as set forth in claim 1 in which the catalyst is of the type used with the Grignard synthesis.

3. A process as set forth in claim 1 in which the catalyst is a heterocyclic nitrogen compound.

4. A process as set forth in claim 1 in which the catalyst is pyridine.

5. A process as set forth in claim 1 in which the temperature of the reaction mass is maintained below the boiling point of the halogen compound.

6. The process of producing a hydrocarbon compound of lead which comprises treating the lead with a hydrocarbon compound of bromine, and subjecting the reaction mass to reduction with nascent hydrogen.

7. A process as set forth in claim 6 in which the hydrocarbon compound is an alkyl compound of bromine.

8. A process as set forth in claim 6 in which the hydrocarbon compound of bromine is ethyl bromide.

9. A process as set forth in claim 6 in which a catalyst is used.

10. A process as set forth in claim 6 in which the catalyst is a heterocyclic nitrogen compound.

11. A process as set forth in claim 6 in which the catalyst is pyridine.

12. The process of producing a hydrocarbon compound of lead which comprises mixing the lead with a hydrocarbon compound of a halogen and a substance adapted to react with water to release active hydrogen; and slowly adding water to said mixture.

13. A process as set forth in claim 12 in which some of the hydrocarbon compound of the halogen reacts in the liquid phase.

14. A process as set forth in claim 12 in which a catalyst is employed.

15. A process as set forth in claim 12 in which a catalyst of the type used with the Grignard synthesis is employed.

16. A process as set forth in claim 12 in which a catalyst of the type used in the Grignard synthesis is employed, and the substances are made to react under such conditions of temperature and pressure that a liquid phase is always present.

17. The process of producing a lead tetra alkyl compound which comprises mixing the lead with an alkyl compound of a halogen and a metal adapted to react with water to release nascent hydrogen therefrom; and slowly adding water to the reaction mass.

18. The process of producing lead tetra ethyl which comprises mixing the lead with an ethyl compound of a halogen and a metal adapted to react with water to release nascent hydrogen, slowly adding water to the reaction mass, forming lead diethyl, and thermally decomposing the lead diethyl forming lead tetraethyl.

19. A process of the kind set forth in claim 17 in which a catalyst is used.

20. A process of the kind set forth in claim 18 in which a catalyst is employed.

21. A process as set forth in claim 17 in which the alkyl halide is an ethyl halide and lead tetraethyl is formed.

22. A process as set forth in claim 18 in which the alkyl halide is ethyl bromide and lead tetraethyl is formed.

23. A process as set forth in claim 17 in which the alkyl halide is an ethyl halide, and a catalyst which is a heterocyclic nitrogen compound.

In testimony whereof I hereto affix my signature.

THOMAS MIDGLEY, Jr.